United States Patent
Götz

(10) Patent No.: US 8,766,594 B2
(45) Date of Patent: Jul. 1, 2014

(54) METHOD AND DEVICE FOR THE EFFICIENT CHARGING OF A VEHICLE BATTERY

(75) Inventor: Jürgen Götz, Taufkirchen (DE)

(73) Assignee: Siemens Aktiengesellschaft, Munich (DE)

(*) Notice: Subject to any disclaimer, the term of this patent is extended or adjusted under 35 U.S.C. 154(b) by 363 days.

(21) Appl. No.: 13/227,908

(22) Filed: Sep. 8, 2011

(65) Prior Publication Data
US 2012/0056583 A1    Mar. 8, 2012

(30) Foreign Application Priority Data
Sep. 8, 2010   (DE) .......................... 10 2010 040 395

(51) Int. Cl.
*H01M 10/44*   (2006.01)
*H01M 10/46*   (2006.01)
(52) U.S. Cl.
USPC .......................................................... 320/109

(58) Field of Classification Search
USPC .................. 320/103, 107, 108, 109, 132, 149
See application file for complete search history.

(56) References Cited

U.S. PATENT DOCUMENTS

2011/0074350 A1* 3/2011 Kocher .......................... 320/109
2012/0200256 A1* 8/2012 Tse ................................ 320/109

* cited by examiner

*Primary Examiner* — Edward Tso
(74) *Attorney, Agent, or Firm* — Laurence A. Greenberg; Werner H. Stemer; Ralph E. Locher

(57) ABSTRACT

A method and a device are provided for the efficient charging of a vehicle battery of an electric vehicle by a charging station of a group charging station. The connected vehicle battery, starting from an initial charge state, is charged in accordance with a calculated charge priority value until the charge state of the vehicle battery reaches a selectable charge state. The calculated charge priority values of the vehicle batteries connected at the same time to the charging stations of the group charging station determine which batteries will be charged within a charging interval.

15 Claims, 3 Drawing Sheets

METHOD AND DEVICE FOR THE EFFICIENT CHARGING OF A VEHICLE BATTERY

CROSS-REFERENCE TO RELATED APPLICATION

This application claims the priority, under 35 U.S.C. §119, of German application DE 10 2010 040 395.4, filed Sep. 8, 2010; the prior application is herewith incorporated by reference in its entirety.

BACKGROUND OF THE INVENTION

Field of the Invention

The invention relates to a method and a device for the efficient charging of a vehicle battery of an electric vehicle by a charging station of a centrally-controlled charging station system (group charging station).

Increasingly vehicles are being at least partly electrically driven. In such cases an electric motor provided in the vehicle is supplied with electrical energy by a vehicle battery. The vehicle battery can be integrated into the electric vehicle. Electric vehicles can also have exchangeable vehicle batteries. A vehicle battery can in such cases be electrically charged, either in-situ or when removed from the vehicle, by a charging station which is connected to a power supply network. A group charging station has a number of charging stations for charging electric vehicles. Group charging stations make it possible to charge a number of electric vehicles or vehicle batteries at the same time. These group charging stations can typically be located in car parks or on company premises or the like. As the number of electric vehicles increases, there is an increasing demand for charging the vehicle batteries connected to the charging stations of a group charging station as efficiently as possible, in order to distribute the energy or the amount of charge available in a sensible manner when charging the vehicle batteries and simultaneously to take account of the needs of the customers, i.e. of the vehicle drivers.

SUMMARY OF THE INVENTION

An object of the present invention is thus to create a method and a device for the efficient charging of a vehicle battery of an electric vehicle by a charging station of a group charging station.

The invention creates a method for the efficient charging of a vehicle battery of an electric vehicle by a charging station of a group charging station. The connected vehicle battery is charged, starting from an initial charge state, in accordance with a calculated charging priority value, until the charge state of the vehicle battery reaches a selectable charge state. The calculated charging priority values of the vehicle batteries connected simultaneously to the charging station of the group charging station define the order with which the different vehicle batteries will be charged within a charging interval.

In a possible form of embodiment of the inventive method, once the battery of the electric vehicle has been connected to the charging station of the group charging station, after a corresponding user entry the vehicle battery is initially charged by the charging station according to a given priority, in a first charging phase based on the initial charge state of the connected vehicle battery in relation to other vehicle batteries that are connected to the other charging stations of the same group charging station, until the charge state of the vehicle battery reaches a minimum charge state within a selectable charging period. In a second charging phase, the vehicle battery is finally charged until it reaches the end charge state in the order determined by the calculated charging priority value of the vehicle battery for the charging interval.

The order relates to the choice made at the beginning of the scheduling interval of vehicle batteries to be served in the current scheduling interval or charging interval.

In a possible form of embodiment of the inventive method the charging priority value of the connected vehicle battery of the electric vehicle is calculated as a function of the amount of charge still outstanding until the end charge state is reached and a deviation of the instantaneous charge state of the vehicle battery from a setpoint charge state determined by a charge curve.

In a possible form of embodiment of the inventive method the vehicle battery of the electric vehicle will be charged in a first charging phase with a first charge curve until the minimum charge state is reached and in a second charging phase with a second charge curve until the end charge state is reached.

In a possible form of embodiment of the inventive method the first charge curve and also the second charge curve are each formed by a linear charge curve.

In a possible form of embodiment of the inventive method the charge curves are dynamically adapted during the charging process.

In a further possible form of embodiment of the inventive method the charging interval is dynamically adapted over a period of time.

In a possible form of embodiment of the inventive method the charge priority value of the connected vehicle battery of the electric vehicle is additionally calculated as a function of further charging criteria.

In a possible form of embodiment of the inventive method these charging criteria of a vehicle battery of the electric vehicle include, an electric vehicle type, an electric vehicle function, a time of day at which the electric vehicle is connected and a contract priority of the electric vehicle.

The invention further contains a group charging station for the efficient charging of a vehicle battery of an electric vehicle by a charging station of the group charging station. A connected vehicle battery is charged, starting from an initial charge state, in accordance with a calculated charging priority value until the charge state of the vehicle battery has reached a selectable end charge state. The calculated charging priority values of the vehicle batteries connected at the same time to the charging stations of the group charging station determine the schedule with which the different vehicle batteries will be charged within a charging interval by the group charging station.

In a possible form of embodiment of the inventive group charging station, once the vehicle battery of the electric vehicle has been connected to the charging station of the group charging station, after a corresponding user entry, the vehicle battery is initially charged by the charging station in a first charging phase according to a priority based on a charge state of the connected vehicle battery in relation to other vehicle batteries that are connected to further charging stations of the group charging station until the charge state of the vehicle battery reaches a selectable minimum charge state within a selectable charging period. In a subsequent second charging phase, the final charging of the vehicle battery is undertaken until the end charge state is reached.

In a possible form of embodiment of the inventive group charging station the vehicle battery of the electric vehicle is connected via a charging cable to the charging station of the group charging station.

In a further possible form of embodiment of the inventive group charging station the vehicle battery of the electric vehicle is connected by inductive coupling to the charging station of the group charging station.

In a possible form of embodiment of the inventive group charging station the charging station possesses a user interface for entry of user settings.

In a possible form of embodiment of the inventive group charging station these user settings contain the minimum charge state to be achieved in the first charging phase, the desired time until a minimum charge state is reached, the end charge state to be reached in the second charging phase and the desired time until the end charge state is reached.

In a possible form of embodiment of the inventive group charging station the minimum charge state to be reached is entered manually into the user interface of the charging station as a proportion of an overall charge capacity of the vehicle battery.

In a possible form of embodiment of the inventive group charging station the overall charge capacity of the vehicle battery is determined by the charging station on the basis of the type of vehicle battery or on the basis of the type of electric vehicle by accessing a database.

In a possible form of embodiment of the inventive charging station the inventive charging station has a charge schedule which carries out a method for efficient charging of a vehicle battery of an electric vehicle by a charging station of a group charging station and controls the charging stations of the group charging station accordingly, whereby, for efficient charging of the vehicle battery, the connected vehicle battery is charged in each case starting from an initial charge state in accordance with a calculated charging priority value until the charge state of the vehicle battery reaches a selectable charge state and whereby the calculated charging priority values of the vehicle batteries connected simultaneously to the charging stations of the group charging station determine the order with which the different vehicle batteries will be charged within a charging interval.

In a possible form of embodiment of the inventive group charging station the group charging station is connected to a power supply network and obtains the amount of charge needed to charge the vehicle batteries from the power supply network.

In a possible form of embodiment of the inventive group charging station the vehicle battery connected to the charging station is built into the electric vehicle.

In an alternate form of embodiment of the inventive group charging station the vehicle battery connected to the charging station is charged while removed from the electric vehicle.

Other features which are considered as characteristic for the invention are set forth in the appended claims.

Although the invention is illustrated and described herein as embodied in a method and a device for the efficient charging of a vehicle battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
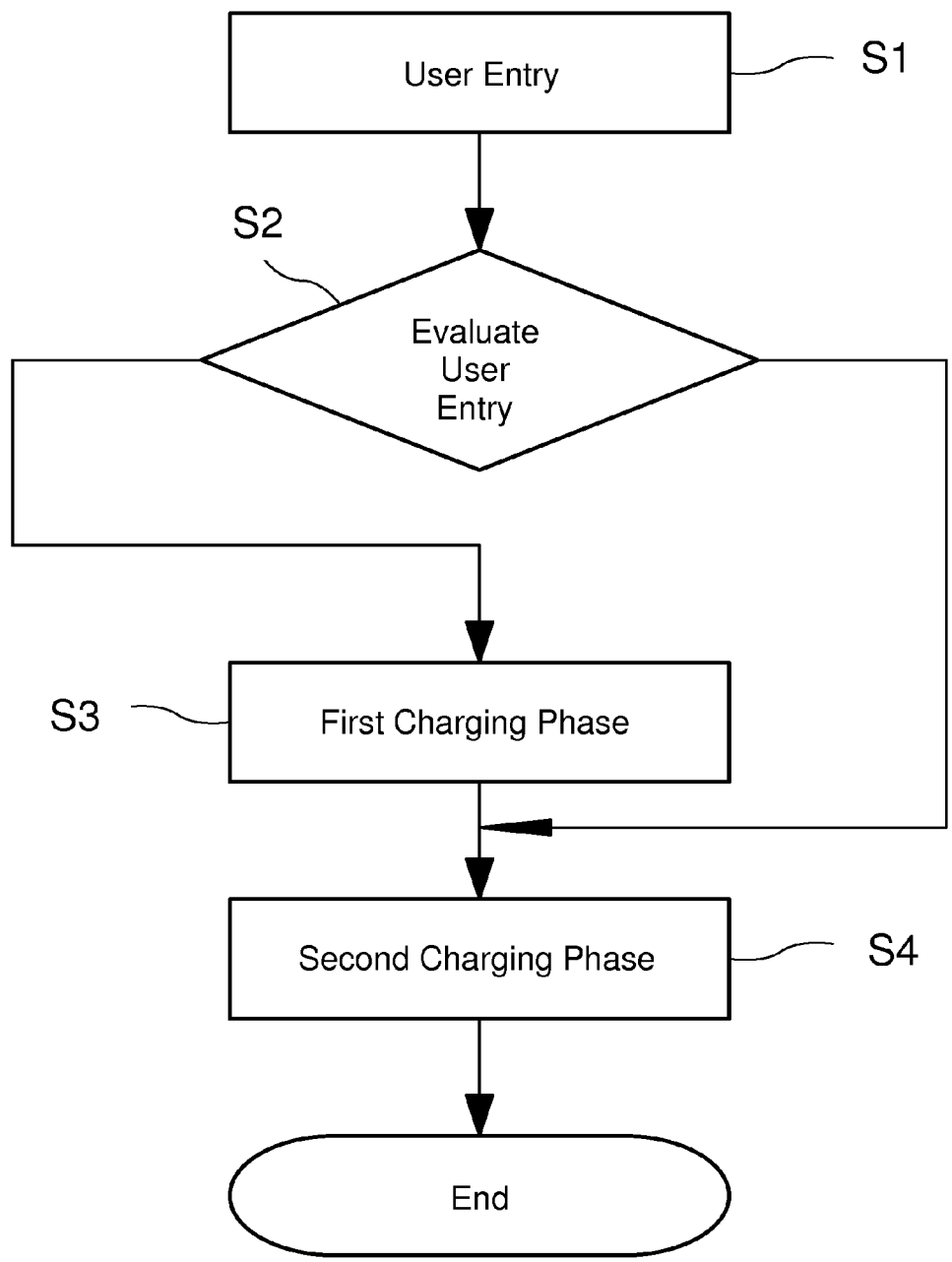
FIG. 1 is a flow diagram for explaining a possible exemplary embodiment for the efficient charging of a vehicle battery according to the invention.

Referring now to the figures of the drawing in detail and first, particularly, to FIG. 1 thereof, there is shown inventive method steps for an efficient charging of a vehicle battery of an electric vehicle by a charging station of a group charging station, after connection of a vehicle battery to the charging station of the group charging station. A user entry, which is entered for example via a user interface of the respective charging station in step S1, is awaited. With the user entry a user, for example a driver of the electric vehicle, can decide whether the charging of the vehicle battery is to be undertaken in a single stage in one charging phase or in two stages in two charging phases. In the first charging phase the vehicle battery is charged according to a priority until a minimum charge state is reached. In the second charging phase the vehicle battery is charged until it reaches an end charge state.

In a step S2 the user entry is evaluated and a decision is made as to whether the user requires a two-stage or two-phase charge or not. If the user has selected a two-phase charge, the vehicle battery is initially charged in a step S3, starting from its initial charge state within a selectable charge time until a selectable minimum charge state is reached. If it is established in step S2 that the user would like to skip this first charge phase and directly requires a charging of the vehicle battery to an end charge state, direct charging is undertaken to reach the end charge state in a step S4, as is shown in FIG. 1.

The connected vehicle battery is charged, starting from an initial charge state, in accordance with a calculated charging priority value, until the charge state of the vehicle battery reaches a selectable charge state. In this case the calculated charge priority values of the vehicle batteries connected simultaneously to the charging stations of the group charging station determine the order with which the different vehicle batteries will be charged within a charging interval. When the vehicle battery is connected in step S1 to the charging station of the group charging station, after a corresponding user entry the vehicle battery is initially charged in the first charging phase in step S3, starting from its initial charge state in relation to other vehicle batteries that are connected to other charging stations of the group charging station in accordance with a priority, until the charge state of the vehicle battery achieves a selectable minimum charge state within a selectable charging time. In a second charging phase the final charging of the vehicle battery is then undertaken in a step S4 until the end charge state is reached in the order determined by the calculated charge priority values of the vehicle batteries.

In a possible form of embodiment in this case the charging priority value of the connected vehicle battery of the electric vehicle is calculated as a function of the amount of charge still outstanding until the end charge state is achieved and is a function of a deviation of the instantaneous charge state of the vehicle battery from a setpoint charge state determined by a charge curve. In this case the vehicle battery of the electric vehicle is charged in step S3 in the first charging phase with a first charge curve until the minimum charge state is reached. Subsequently the vehicle battery is charged in the second charging phase in step S4 with a second charge curve until the final charge state is reached.

In a possible form of embodiment the first charge curve used in step S3 and the second charge curve used in step S4 is a linear charge curve in each case.

In an alternate form of embodiment other shapes of charge curve, for example an exponential approximation or the like, are possible.

The charge curves used in step S3 and S4 can be statically predetermined in a possible form of embodiment. In an alternate form of embodiment the charge curves used in step S3, S4 are able to be dynamically adapted during the charging process.

The calculation of the charging priority value of the connected vehicle battery can, in a possible form of embodiment, be carried out by a scheduler provided in the group charging station. The charge scheduler typically has a microprocessor for executing a corresponding calculation algorithm. The charge priority value of the connected vehicle battery is calculated in a possible form of embodiment as a function of the amount of charge still outstanding until the final charge state is reached as well as a variation of the instantaneous charge state of the vehicle battery from a setpoint charge state determined by the respective charge curve.

In a further form of embodiment the charge priority value of the connected vehicle battery is also calculated by the processing unit of the load scheduler as a function of further charging criteria. Charging criteria can typically include the type of electric vehicle and also the function of the electric vehicle. Further charging criteria are a time of day at which the electric vehicle is connected as well as a contractual priority of the electric vehicle.

Figure 2:
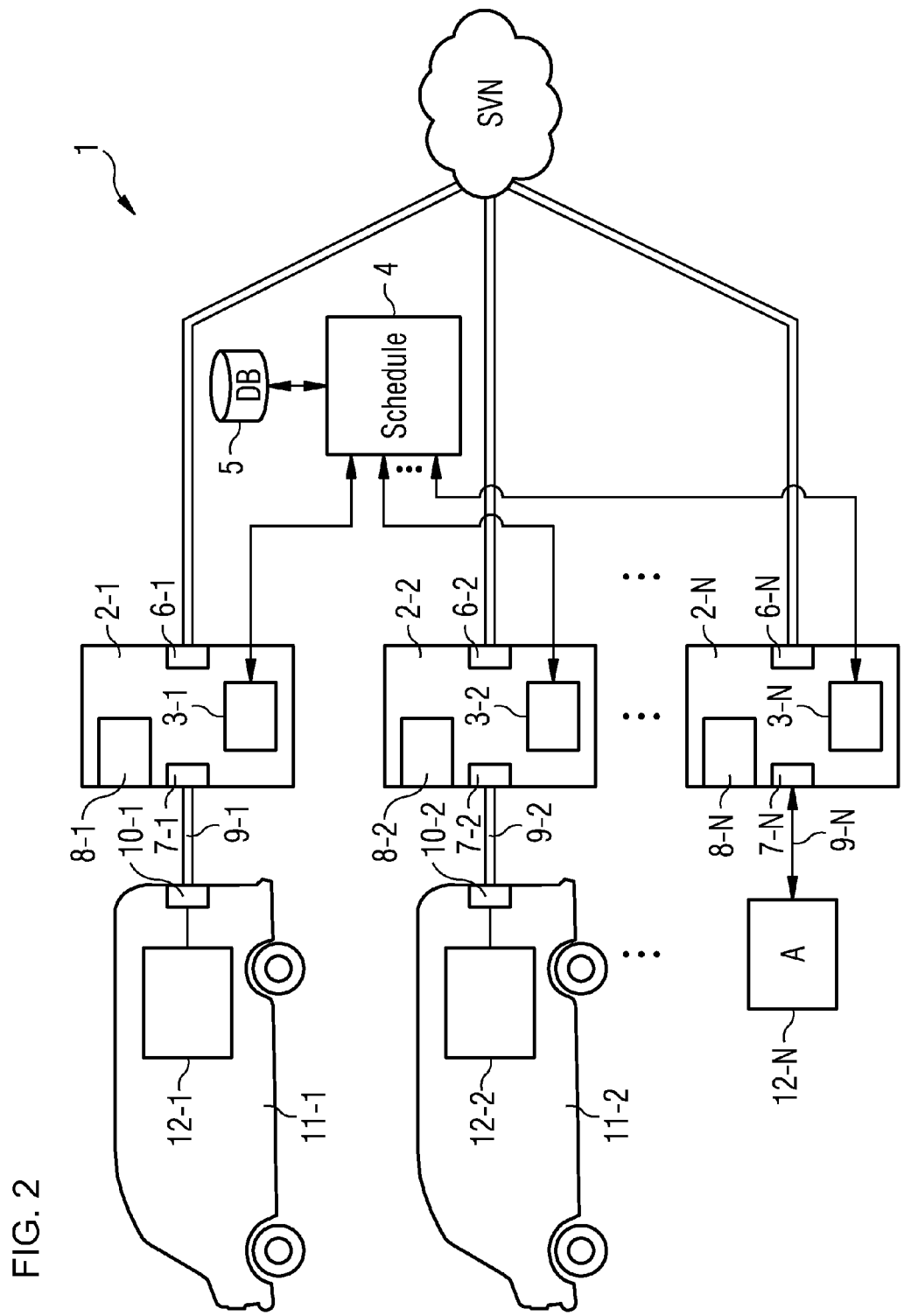
FIG. 2 is an illustration showing a diagram to explain a form of an exemplary embodiment of an inventive group charging station.

FIG. 2 shows an exemplary embodiment for an inventive group charging station 1. The group charging station 1 in such cases has a predetermined number of charging stations 2-1, 2-2, ... 2-n. The charging stations 2-i preferably each have an internal controller 3-i, which is connected via a control line or a control bus respectively to the charge scheduler 4 of the group charging station 1. In a possible form of embodiment the charge scheduler 4 has access to a local data memory or via a network to a database 5. The database 5 can for example contain data in respect of different vehicle battery types and different electric vehicles. In a possible form of embodiment the scheduler 4 is connected to the database 5 by a data network, for example the Internet. Each charging station 2-i of the group charging station 1 has an interface 6-i for connection to a power supply network SVN. In addition the charging stations 2-i each have an interface 7-i for connecting a vehicle battery to the charging station 2-i. In addition a user interface or a graphical user interface 8-i can be provided at each charging station 2-i. In the exemplary embodiment shown in FIG. 2 a vehicle battery can be connected for charging to the charging interface 2-i. The vehicle battery in this case can be charged in-situ or when removed from the vehicle. In the exemplary embodiment shown in FIG. 2 a respective charge connection 10-1, 10-2 of an electric vehicle 11-1, 11-2 is connected via a charge cable 9-1, 9-2. The charge connection 10-1, 10-2 is connected in this case via an internal charge line of the vehicle to a vehicle battery 12-1, 12-2 fitted therein. At charging station 2-N of the group charging station 1 a vehicle battery 12-N is connected directly via a charge cable 9-N to the charge interface 7-N of the charging station 2-N. In the exemplary embodiment shown in FIG. 2 the vehicle batteries 12-i are thus connected via charge cables to charging station 2-i.

In an alternate form of embodiment the vehicle batteries 12-i can also be charged by an inductive coupling.

The user interface 8-i of charging station 2-i gives the user, for example a driver of the electric vehicle, the opportunity to enter specific user settings. The user or driver can specify in this case whether single-phase or one-stage charging or two-phase or two-stage charging is required. To this end the user or driver has the option of entering these parameters via the user interface 8-i in the charging station 2-i. In this case the user or driver can enter the charge state to be achieved in the first charge phase and a charge time until the minimum charge state $P_{min}$ is reached. The driver can also enter the end charge state $P_{end}$ to be achieved in the second charge phase and a required time until the end charge state is reached. In a possible form of embodiment, the minimum charge state $P_{min}$ to be reached is entered manually via the user interface 8-i by the user as a proportion of the total charge capacity of the vehicle battery 12-i of a vehicle 11-i. In a possible form of embodiment the total charge capacity $C_{Ges}$ of the vehicle battery 12-i to be charged is determined by the charging station 2-i on the basis of the type of vehicle battery. In this case the total charge capacity $C_{Ges}$ of the vehicle battery 12-i can also be determined on the basis of the type of electric vehicle 11-i.

In a possible form of embodiment the charge scheduler 4, to determine the total charge capacity $C_{Ges}$ of the vehicle battery 12-i, accesses data which is stored in the database 5 for example. In this form of embodiment the charging station 2-i detects the type of vehicle battery 12-i or the type of electric vehicle 11-i and notifies this type to the charge scheduler 4 which accesses the database 5. The charge scheduler 4 then notifies the total charge capacity $C_{Ges}$ of the vehicle battery 12-i of the respective vehicle 11-i to the internal controller 3-i of the charging station 2-i. The charging stations 2-i of the group charging station 1 are, as shown in FIG. 2, connected to a power supply network SVN and obtain the amounts of charge necessary for charging the vehicle batteries 12-i from the power supply network SVN.

In a possible form of embodiment the plurality of vehicle batteries 12-i which are connected to the group charging station 1 can also be used for flexible storage of electrical energy for the power supply network SVN.

Figure 3:
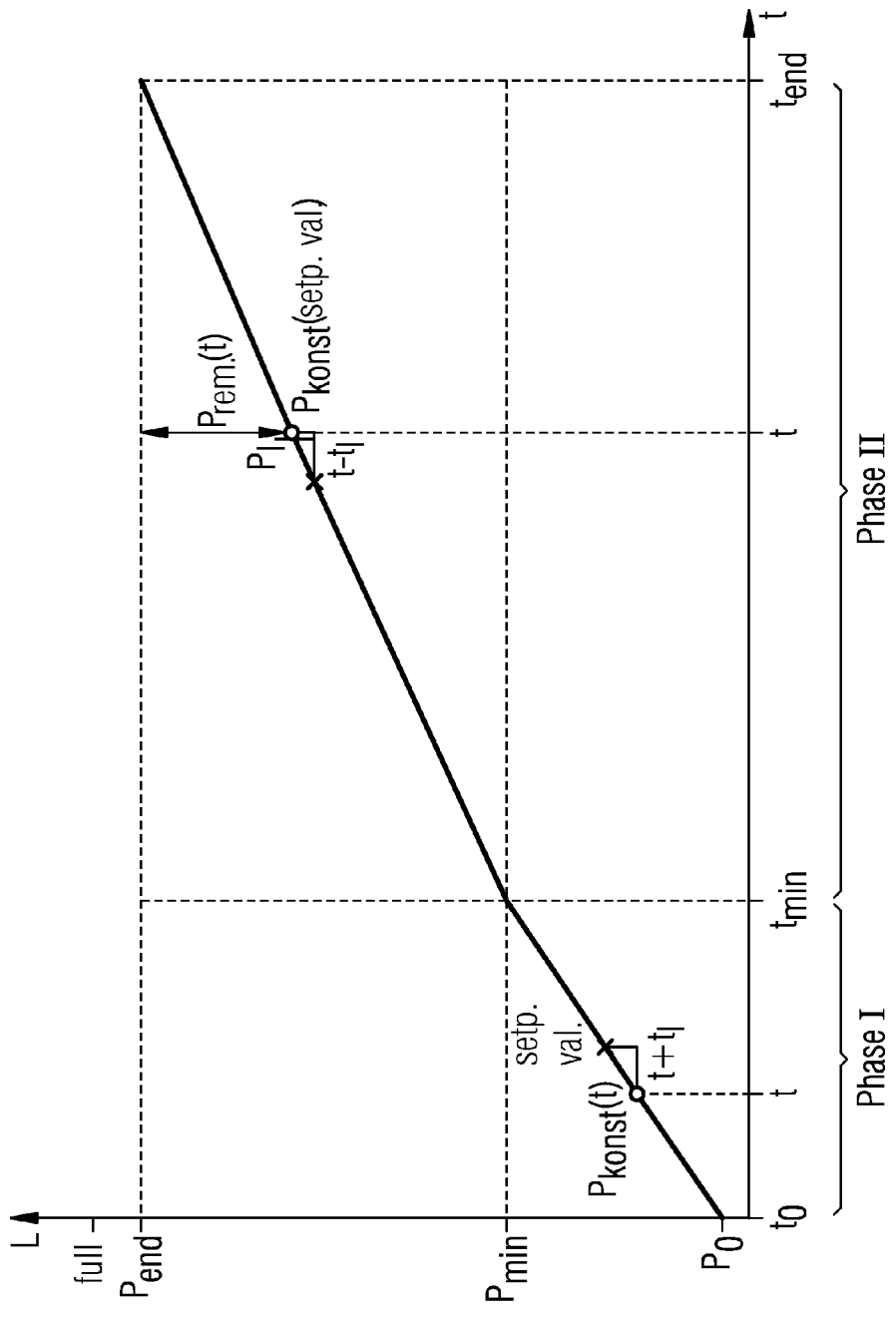
FIG. 3 is a graph showing a charging diagram to explain a form of embodiment of the inventive method.

FIG. 3 shows a charge time diagram to explain an exemplary embodiment of the inventive method for efficient charging of a vehicle battery of an electric vehicle by a charging station of a group charging station 1 in accordance with the invention. The figure shows the charge state L over the time t. In the exemplary embodiment shown in FIG. 3 the vehicle battery is charged in two phases, each with a linear charge curve. The first charging phase I in this case represents an optional charging phase, whereby the charging process in step S3 of the charging sequence shown in FIG. 1 is executed. In this first charging phase I the vehicle battery must reach a minimal charge state $P_{min}$ in accordance with the user requirement based on a specific predetermined charge time, i.e. up to a certain time $t_{min}$. This optional charge phase I is only executed if the user or driver enters a value for the minimum amount of charge $P_{min}$ via the user interface 8-i. In a second non-optional, mandatory phase II a maximum end charge state $P_{end}$ is reached. In this case the vehicle battery should reach a maximum charge state $P_{end}$ by a certain point in time $t_{end}$. Charge phase II is carried out as soon as charge phase I is ended. Charge phase I is optional and can also be skipped.

If the driver of the electric vehicle 11-$i$ has connected to a charging column 2-$i$ of the group charging station 1, he can enter the following parameters that the charging column 2-$i$:

A desired minimum charge state $P_{min}$ (optional);

A desired time until the minimum charge state $P_{min}$, is reached, i.e. the charging time until the charge point $t_{min}$ is reached (optional);

The desired end charge state $P_{end}$ (mandatory); and

A desired time until the end charge state $P_{end}$ is reached, i.e. the desired time until the end charge state is reached (mandatory).

The operator of the group charging station 1 calculates on the basis of the entered data or customer requirements whether the desired minimum charge state is able to be realized or achieved within the time $t_{min}$. This can be done on the basis of a total amount of energy reserved in advance. If the operator of the group charging station 1 accepts these two given parameters, he guarantees the user the required minimum amount of charge $P_{min}$ at time $t_{min}$ and shows the driver a fixed price, via a display of the user interface 8-$i$ for example. If the driver or customer accepts the displayed price by making an appropriate entry, it is agreed that it is mandatory for a minimum charge state $P_{min}$ at time $t_{min}$ to be achieved at the agreed or fixed price. If the user or customer does not accept the displayed price, the charge phase I is skipped.

In a possible form of embodiment the operator of the group charging station 1, if he does not accept the parameters entered by the user or customer, i.e. the required minimum amount of charge $P_{min}$ and the required charging time until the minimum charge state $T_{min}$ is reached, can suggest or display his own values for the two parameters, including an associated price. If the user or customer in this exemplary embodiment accepts the new parameters suggested by the operator of the group charging station 1 in respect of the minimum charge state $P_{min}$ and the associated charging time, it is thus agreed that the minimum charge state $P_{min}$ will definitely be reached within the associated charging time and the price set. If in this form of embodiment the user or customer does not accept the new parameters and the associated price suggested by the operator of the group charging station 1, charging phase I is skipped. For charging phase II a maximum price applies for the price of the amount of charge or amount of energy which will be displayed at the charging station 2-$i$ and may not be exceeded. In the first charging phase I, i.e. in step S3 of the method shown in FIG. 1, it is first ensured that all vehicle batteries or vehicles which are in charge phase I, whose parameters $P_{min}$ and $t_{min}$ have been accepted, can be serviced by the group charging station 1. In such cases the operator of the group charging station 1 has at least enough charging capacity to enable him to service all vehicle batteries or electric vehicles in charge phase I or to obtain a corresponding charge externally by purchasing it.

All decisions about which vehicle batteries 12-$i$ will be charged within the current scheduling interval and which will not be charged (both charging phases) are made at the beginning of the scheduling interval and no further changes are made during the current scheduling interval.

It should also be ensured that each vehicle battery 12-$i$ within a scheduling interval is always either not allocated any charge amount at all or is allocated precisely the fixed amount of energy $P_I$ that the vehicle battery can accept within the time $t_I$. This amount of charge is known to the group charging station based on the type of vehicle battery or on the possible charge capacity of the charging station 2-$i$.

The vehicle battery 12-$i$ must be charged by a certain time $t_{min}$, i up to a certain level of charge and a minimum charge state i. At the time of a first scheduling interval $t_0$ the vehicle battery 12-$i$ has an initial charge state $P_0$, i. The setpoint charge curve shown in FIG. 3 between $t_0$ and $t_{min}$ can be adapted individually for each vehicle battery 12-$i$ to an available amount of energy. In the exemplary embodiment shown in FIG. 3 a linear setpoint charge curve is provided in charge phase I. Then, in charge phase I within the current scheduling time interval, all those vehicle batteries are charged of which the charge level after expiry of $t_I$ would be less than the required minimum, whereby $t_I$ is the duration of the scheduling interval $$P_{konst,i}(t) = P_{0,i} + \lfloor (P_{min,i} - P_{0,i})/(t_{min,i} - t_{0,n}) \rfloor * (t - t_{0,i});$$

if
$P_i(t) < P_{konst,i}(t) + \lfloor (P_{min,i} - P_{0,n})/(t_{min,n} - t_{0,n}) \rfloor * t_I$ (for linear setpoint charge curve);
$P_i(t) < P_{Soll,i}(t + t_I)$ (for any given setpoint charge curve);
then
   i charge in interval $t_I$: $P_i(t + t_I) = P_i(t) + P_{I,i} * t_I$;
else
   do not charge in interval $t_I$.

The sum of the required amount of energy in the current scheduling interval for all electric vehicles or vehicle batteries in charge phase I for the time interval $t_I$ is then expressed as $$P_{Phase1}(t_I).$$

The remaining amount of energy $P_{Phase2}(t_I)$ for the electric vehicles or vehicle batteries in charge phase II in the current scheduling is then expressed as:

$$P_{Phase2}(t_I) = P_{tot}(t_I) - P_{Phase1}(t_I) \qquad \text{(correct equation)}$$

whereby $P_{tot}(t_I)$ is that amount of energy that is available to the operator of the group charging station 1 in time interval ($t_I$).

After conclusion of charging phase I, in charging phase II all electric vehicles or vehicle batteries which have already reached the minimum charge state $P_{min}$, have the opportunity to be further charged up to charge state $P_{end}$, i. The vehicle battery 12-$i$ or the electric vehicle 11-$i$ can thus be charged in this charging phase II by a certain point in time $t_{end}$, i up to a certain charge state $P_{end}$, i. At time $t_{min}$, i the electric vehicle or the vehicle battery must have a charge state of $P_{min}$, i.

The setpoint charge curve between time $t_{min}$ and time $t_{end}$ shown in FIG. 3 can be adapted for a possible form of embodiment for each electric vehicle individually to the available amount of energy. In the exemplary embodiment shown in FIG. 3 a linear setpoint charge curve is also provided in the second charging phase II.

In the inventive method, for each electric vehicle or vehicle battery in charging phase II, a criterion value or a charging priority value is preferably calculated in the following way:

$\Delta_i(t_{min,i}) = 0$; (Initialization of the $\Delta$ value of the charging process relative to the setpoint charging rate);
$P_{rest,i}(t) = P_{end,i} - P_i(t)$; (amount still to be charged by $t_{end,i}$);
$P_{konst,i} = \lfloor (P_{end,i} - P_{min,i})/(t_{end,i} - t_{min,i}) \rfloor * t_I$; (for setpoint curve: Required charging rate in previous scheduling interval);
$P_{konst,i} = P_{Soll,i}(t) - P_{Soll,i}(t - t_I)$); (for any given setpoint curve: required charging rate in previous scheduling interval);
if (i selected for $t - t_I$) (i selected in last scheduling interval)
then
$P_{I,i}(t) = P_{I,i}$;
else
$P_{I,i}(t) = 0$.

The deviation of the actual value from the setpoint value is then calculated as follows:

$$\Delta_i(t)=\Delta_i(t-t_I)+(P_{konst,i}-P_{I,i}(t)).$$

From this a criterion value or a charge priority value for each electric vehicle 11-$i$ or each vehicle battery 12-$i$ is then determined for charging phase II as follows:

$$\text{crit},i(t)=\min(P_{rest,i}(t),\Delta_i(t)).$$

The criterion values or charge priority values of all electric vehicles 11-$i$ or of all vehicle batteries 12-$i$ in charging phase II are now arranged according to size, i.e. sorted from the highest charging priority value through to the lowest charging priority value and entered into a criteria list. In accordance with the new arrangement in this criteria list the vehicles 11-$i$ or the vehicle batteries 12-$i$ are now re-sorted in accordance with their charging priority value. This new arrangement is identified here by the index j. The index j runs from value 1 (highest charging priority value) to m (lowest charging priority value of all vehicles or batteries in charging phase II).

All electric vehicles 11-$i$ or vehicle batteries 12-$i$ are serviced in the current charging time interval $t_I$ by the group charging station 1, provided the operator of the group charging station 1 has enough energy available:

While $$P_{Sum}(1,\ldots j-1)+P_{I,j} \le P_{Phase2}(t_I)$$

service vehicle battery 12-$i$ that belongs to index j in the current scheduling interval.

The corresponding values $P_i(t)$ are updated accordingly.

In a possible form of embodiment the flexible interval $t_I$ can even be set dynamically by the operator of the group charging station 1. In a possible form of embodiment the scheduling interval $t_I$ ranges between 1 and 15 minutes. For each scheduling interval or charging time interval the resources, e.g. the amount of charge newly allocated for each electric vehicle or vehicle battery, can remain constant over the entire charging interval. The electric vehicle or the vehicle battery is either not allocated any amount of energy in a scheduling interval or charging interval or is allocated the fixed amount of energy $P_I$, i which the charging column 2-$i$ can supply within the charging interval $t_I$ to the electric vehicle 11-$i$ (discrete on/off mechanism). Time $t_0$ represents for each electric vehicle 11-$i$ the time at which the first scheduling interval or charging time interval $t_I$ begins after connection to the corresponding charging station 2-$i$.

The inventive method for efficient charging of a vehicle battery 12-$i$ of an electric vehicle 11-$i$ by a charging station 2-$i$ of a group charging station 1 takes account both of the interests of the operator of the group charging station 1 in respect of an efficient distribution of the electrical energy per scheduling interval and also the wishes of the drivers or users in respect of optimum service. The inventive method ensures that, if a user requires a minimum charge state after a certain time (at an agreed fixed price) the user or driver receives a minimum charge state guaranteed. Charging phase I, until the minimum charge state is reached, always takes priority over charging phase II, i.e. reaching the maximum charge state. During charging phase I and charging phase II the operator of the group charging station 1 can adapt the setpoint charge curve accordingly, and can even do this dynamically, i.e. from scheduling interval to scheduling interval. In charge phase I it is ensured for each scheduling interval $t_I$ that the charge state reached corresponds at least to the setpoint value of the setpoint curve after the scheduling interval has elapsed.

In charge phase II, on the basis of calculated criterion values or charge priority values, it is defined which electric vehicles or vehicle batteries are to be charged in the current scheduling interval and which are not. In this case both the deviation of the actual value from the setpoint value of the charge state is taken into account and also the amount of charge outstanding until the maximum charge amount is reached. The inventive method in this case allows the operator of the group charging station 1 the greatest possible flexibility and efficiency in the allocation of their available energy resources and at the same time guarantees the driver or customer a reliable minimum charge state when keeping to a specific price. The inventive method is simple and easy to implement. The inventive method also takes account, from the standpoint of the operator of the group charging station 1, of all significant criteria, especially simple price calculation as well as flexible and dynamic adaptation to short-term fluctuations in energy prices and energy amounts. The user or driver, as a result of the two-phase nature of the inventive method, has the opportunity of obtaining a guaranteed amount of charge at a predetermined time and for a predetermined price and also of obtaining a desired (but not guaranteed) amount of charge within a desired time, which will also very probably be reached. In this way the operator of the group charging station 1 uses his energy resources in the optimum way within the framework of the current number of electric vehicles connected with the aid of the inventive method. The inventive method thus creates a two-phase scheduling mechanism for charging electric vehicles in environments with centrally-managed charging stations of a group charging station 1.

The invention claimed is:

1. A method for efficient charging of a vehicle battery of an electric vehicle by a charging station of a group charging station, which comprises the steps of:
   calculating a calculated charge priority value of the connected vehicle battery of the electric vehicle in dependence on an amount of charge still outstanding until the end charge state is reached and a deviation of an instantaneous charge state of the vehicle battery from a setpoint charge state determined by a charge curve;
   charging a connected vehicle battery, starting from an initial charge state, in accordance with the calculated charge priority value until a charge state of the connected vehicle battery reaches a selectable charge state; and
   using calculated charge priority values of vehicle batteries connected at a same time to charging stations of the group charging station to determine an order with which different vehicle batteries will be charged within a charging interval.

2. The method according to claim 1, which further comprises:
   after connection of the vehicle battery of the electric vehicle to the charging station of the group charging station, and after an appropriate user entry, charging initially the vehicle battery via the charging station in a first charging phase, starting from the initial charge state of the connected vehicle battery, prioritized in relation to other vehicle batteries that are connected to further charging stations of the group charging station, until the charge state of the vehicle battery reaches a selectable minimum charge state within a selectable charging time; and
   subsequently performing a second charging phase for a final charging of the vehicle battery until the vehicle reaches an end charge state in an order determined by the calculated charge priority values of the vehicle battery for the charging time interval.

3. The method according to claim 2, which further comprises charging the vehicle battery of the electric vehicle in the first charging phase with a first charge curve until the selectable minimum charge state is reached and in the second charging phase with a second charge curve until the end charge state is reached.

4. The method according to claim 3, wherein the first charge curve and the second charge curve are each formed as a linear charge curve.

5. The method according to claim 3, wherein the first and second charge curves are adapted dynamically during the charging process.

6. The method according to claim 1, which further comprises adapting dynamically the charging time interval within a time range.

7. The method according to claim 1, wherein the calculated charge priority value of the connected vehicle battery of the electric vehicle is additionally calculated in dependence on charging criteria selected from the group consisting of an electric vehicle type, an electric vehicle function, a time of day at which the electric vehicle is connected and a contract priority of the electric vehicle.

8. A group charging station for efficient charging of at least one vehicle battery of an electric vehicle, the group charging station comprising:
 charging stations for connecting to vehicle batteries, and starting from an initial charge state, a vehicle battery being charged in accordance with a calculated charge priority value until a charge state of the vehicle battery reaches a selectable end charge state, whereby calculated charge priority values of the vehicle batteries connected at a same time to said charging stations of the group charging station determine a choice of how different vehicle batteries will be charged within a charging time interval by the group charging station;
 a load scheduler for controlling said charging stations for efficient charging of the vehicle battery of the electric vehicle by said charging station, said load scheduler programmed to:
  charge a connected vehicle battery, starting from an initial charge state, in accordance with the calculated charge priority value until the charge state of the vehicle battery reaches a selectable charge state; and
  use calculated charge priority values of the vehicle batteries connected at a same time to said charging stations of the group charging station to determine an order with which different vehicle batteries will be charged within a charging interval.

9. The group charging station according to claim 8, wherein after connection of the vehicle battery of the electric vehicle to said charging station of the group charging station, after an appropriate user entry, the vehicle battery will be initially charged by said charging station in a first charging phase, starting from an initial charge state of the connected vehicle battery prioritized in relation to other vehicle batteries that are connected to further said charging stations of the group charging station, until a charge state of the vehicle battery reaches a selectable minimum charge state within a selectable charging time, and subsequently a second charging phase is undertaken for a final charging of the vehicle battery until the vehicle battery reaches an end charge state in an order determined by the calculated charge priority values of the vehicle battery for the charging time interval.

10. The group charging station according to claim 8, further comprising a charging cable and the vehicle battery of the electric vehicle is connected via said charging cable or by means of inductive coupling to said charging station of the group charging station.

11. The group charging station according to claim 9, wherein said charging station has user interface for entering user settings and the user settings are as follows:
 a minimum charge state to be reached in the first charging phase;
 a time until the minimum charge state is reached;
 an end charge state to be reached in the second charging phase; and
 a desired time until the end charge state is reached.

12. The group charging station according to claim 11, wherein a minimum charge state to be reached is entered manually into said user interface of said charging station as a proportion of a total charge capacity of the vehicle battery.

13. The group charging station according to claim 12, further comprising a database and the total charge capacity of the vehicle battery is determined by said charging station, based on a type of vehicle battery or based on a type of electric vehicle, by accessing said database.

14. The group charging station according to claim 8, wherein said charging stations are connected to a power supply network and obtain an amount of charge needed to charge the vehicle batteries from the power supply network.

15. The group charging station according to claim 8, wherein the vehicle battery is connected to said charging station in situ in the electric vehicle or while removed from the electric vehicle.

* * * * *